J. W. GAMBLE.
PACKING FOR MEASURING APPARATUS.
APPLICATION FILED JULY 19, 1913.
1,199,883. Patented Oct. 3, 1916.
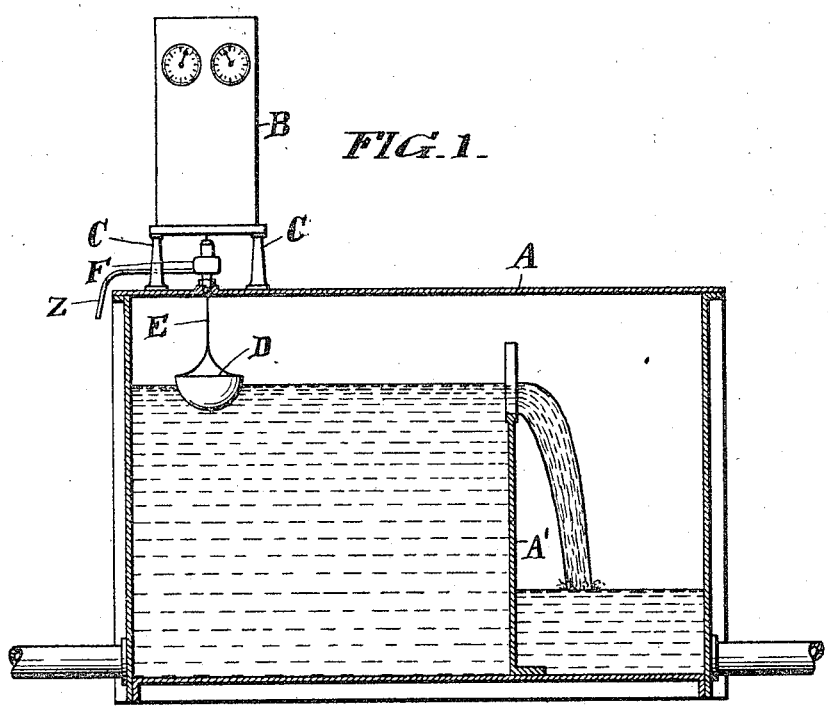
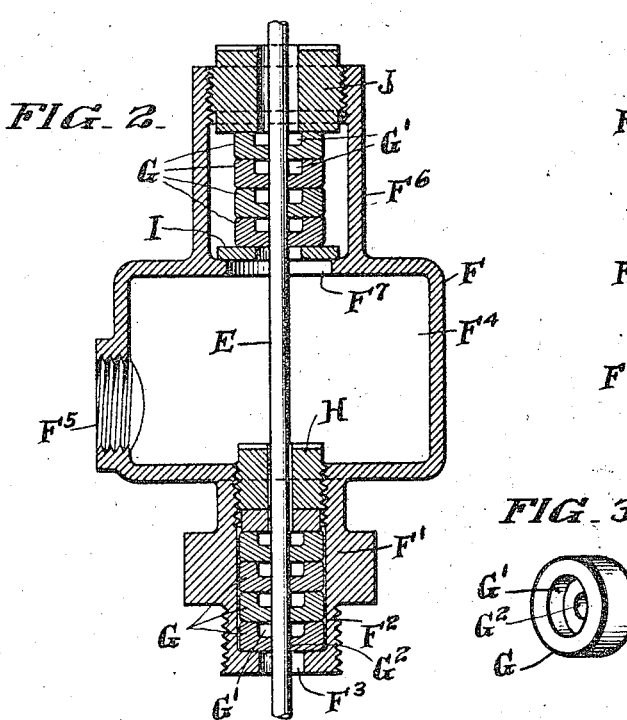
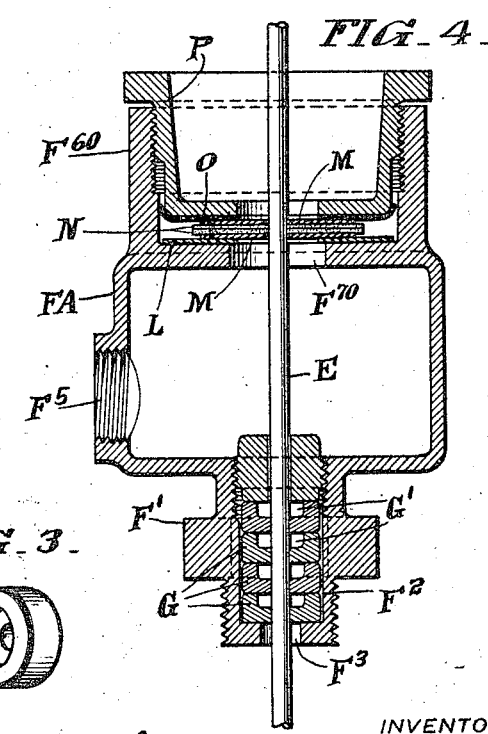
WITNESSES
INVENTOR
Joseph W. Gamble
BY
ATTORNEY

UNITED STATES PATENT OFFICE.

JOSEPH W. GAMBLE, OF PHILADELPHIA, PENNSYLVANIA, ASSIGNOR TO JOSEPH S. LOVERING WHARTON, WILLIAM S. HALLOWELL, AND JOHN C. JONES, ALL OF PHILADELPHIA, PENNSYLVANIA, TRADING AS HARRISON SAFETY BOILER WORKS.

PACKING FOR MEASURING APPARATUS.

1,199,883.   Specification of Letters Patent.   Patented Oct. 3, 1916.

Application filed July 19, 1913. Serial No. 780,088.

*To all whom it may concern:*

Be it known that I, JOSEPH W. GAMBLE, a citizen of the United States of America, residing in the city and county of Philadelphia, in the State of Pennsylvania, have invented certain new and useful Improvements in Packing for Measuring Apparatus, of which the following is a true and exact description, reference being had to the accompanying drawings, which form a part thereof.

My present invention consists in an improved form of rod packing devised primarily for the purpose of obtaining a simple and durable form of packing which can be manufactured at a comparatively low cost, will be effective to prevent leakage along the rod to which the packing is applied, and will offer but slight frictional resistance to the movement of the rod axially in the packing, and will permit a limited transverse bodily movement of the rod necessary for the proper alinement of the latter.

The improved packing is primarily devised for use in connection with weir measuring apparatus, to prevent the leakage out of a closed weir chamber receiving heated liquid along the rod connecting a float within the weir chamber with indicating, recording and registering apparatus located exterior to the weir chamber.

The various features of novelty which characterize my invention are pointed out with particularity in the claims annexed to and forming a part of this specification. For a better understanding of the invention, however, and of the advantages possessed by it, reference should be had to the accompanying drawings and descriptive matter in which I have illustrated and described forms in which my invention may be embodied.

Of the drawings: Figure 1 is an elevation of weir measuring apparatus in which my invention is employed; Fig. 2 is a sectional elevation of the packing box employed in the apparatus shown in Fig. 1; Fig. 3 is a perspective view of one of the packing rings employed; and Fig. 4 is a view taken similarly to Fig. 2, illustrating a modified packing box.

In the drawings, and referring first to the construction shown in Fig. 1, A represents a closed weir chamber suitable for measuring hot water and to have a steam pressure therein somewhat above atmospheric pressure. B is a casing for indicating, recording or registering mechanism located above the weir chamber and carried by the latter through supports C. F represents the packing box for preventing leakage along the rod E of small diameter connected at its lower end to the float D, located within, and rising and falling with the height of liquid level on the supply side of the weir A', in the weir chamber A. The upper end of the rod E projects into the mechanism casing B and serves to operate the mechanism located therein. In the construction illustrated in Fig. 2, the packing box F proper is in the form of a cast metal casing provided with a tubular projection F' from its lower end. The projection F' is externally threaded and is screwed into a tapped aperture in the top wall of the weir chamber, and is interiorly threaded at its upper end to receive the gland H. The latter serves to secure a series of apertured disks G in place between its lower end and the partially closed lower end of the tubular part F'. The aperture $F^3$ in the lower end of the part F' and the central aperture in the gland H are each appreciably larger in diameter than the float rod or stem C, and the chamber $F^2$ within the extension F' is larger in diameter than the disks G. The latter, have smooth end faces, and are each formed with a central cavity or recess G' in one end face, this recess being appreciably larger in diameter than the central hole $G^2$ traversed by the stem C. With the arrangement described the assembled disks G unite to form a labyrinth packing of which the internal grooves are formed by the recesses G'. The central apertures $G^2$ in the disks G are of a diameter to fit the rod C but not tightly enough to offer any appreciable resistance to the axial movement of the rod. The limited lateral movement permitted the disks G is sufficient to permit the rod E to have a certain capacity for alining itself. The packing formed by the disks G possesses all of the usual advantages of a labyrinth packing, and a packing for a rod of small diameter can be made better and much less expensively in the manner described than by turning circumferential grooves in the inner wall of a sleeve or one piece ring of sufficient axial depth to form the packing.

To further guard against the leakage of vapor or steam along the rod C into the mechanism box B, I provide the box F with a threaded tubular extension $F^6$ in which are located a series of rings G similar to those already described and held against endwise movement between a removable washer or base member I and a gland J screwed into the internally threaded outer end of the tubular projection $F^6$. The washer I bears against the apertured inner end of the tubular part $F^6$ at the margin of the aperture $F^7$ therein. The aperture $F^7$ should be large enough in diameter to permit the passage of the lower gland H and the lower washers G. Steam or vapor leaking into the box F may escape to the atmosphere through the vent pipe Z tapped into the threaded aperture $F^5$ in the box F.

The modified construction shown in Fig. 3 differs from that shown in Fig. 2 in the shape of the box FA and the character of the packing provided at the upper side of the box. The packing at the lower side of the box and the lower portion of the box are similar in form to the corresponding portions of the construction shown in Fig. 2, and similar parts in the two constructions are indicated by the same reference symbols. The box FA is provided with an upper tubular projection $F^{60}$ substantially larger than the tubular part $F^6$ of the box F. The gland member P which is threaded into the internally threaded upper end of the tubular part $F^{60}$ is cup shaped and formed with a central aperture substantially larger in diameter than the rod E. Between the bottom of this gland and the inner end of the tubular part $F^{60}$ are located in the order named, a rubber gasket O, a brass washer M having a central aperture slightly larger in diameter than the rod C, a thick felt washer N having a central aperture snugly fitting the rod C, a second brass washer M similar to the one first described, and a larger brass washer L which directly engages the inner end wall of the tubular part $F^{60}$ at the margin of the aperture $F^{70}$ in the latter. With the construction described the brass washers M are free to slide between the rubber gasket O and the brass washer L sufficiently to permit the proper alinement of the rod C while the felt washer N is frictionally gripped between the washers M, in the proper position to prevent the leakage of steam or vapor upward out of the box FA into the mechanism box B.

While in accordance with the provisions of the statutes I have illustrated and described the best forms of my invention now known to me, it will be apparent to those skilled in the art that changes may be made in the form of the apparatus disclosed without departing from the spirit of my invention, and that under some conditions certain features of my invention may be used without a corresponding use of other features.

Having now described my invention, what I claim as new and desire to secure by Letters Patent, is:

1. A labyrinth rod packing comprising a plurality of parallel disks or plates arranged side by side and each formed with a central recess in one face and with a central rod receiving aperture through the bottom wall of, and smaller in diameter than said recess.

2. A labyrinth rod packing comprising a plurality of parallel disks or plates arranged side by side and each formed with a central recess in one face appreciably larger in diameter than the rod to be packed, and with a central rod receiving aperture through the bottom wall of, and smaller in diameter than said recess, and a holder for said disks preventing movement of the disks in a direction perpendicular to their planes while permitting a limited movement parallel thereto.

3. In a rod packing of the kind described, the combination with a tubular casing provided with an inturned flange or shoulder at one end and a removable tubular gland at the opposite end, of a series of parallel washers held between said flange and gland and each formed with a central recess in one face and with a central rod receiving aperture through the bottom wall of, and smaller in diameter than said recess whereby said washers unite to form a tubular sleeve adapted to surround the rod to be packed and said recesses form circumferential grooves in the inner wall of said sleeve.

JOSEPH W. GAMBLE.

Witnesses:
 ROBERT G. CLIFTON,
 M. M. FULTON, Jr.